Aug. 7, 1951 C. A. DOPP ET AL 2,563,012
VALVE
Filed Feb. 17, 1945 2 Sheets-Sheet 1
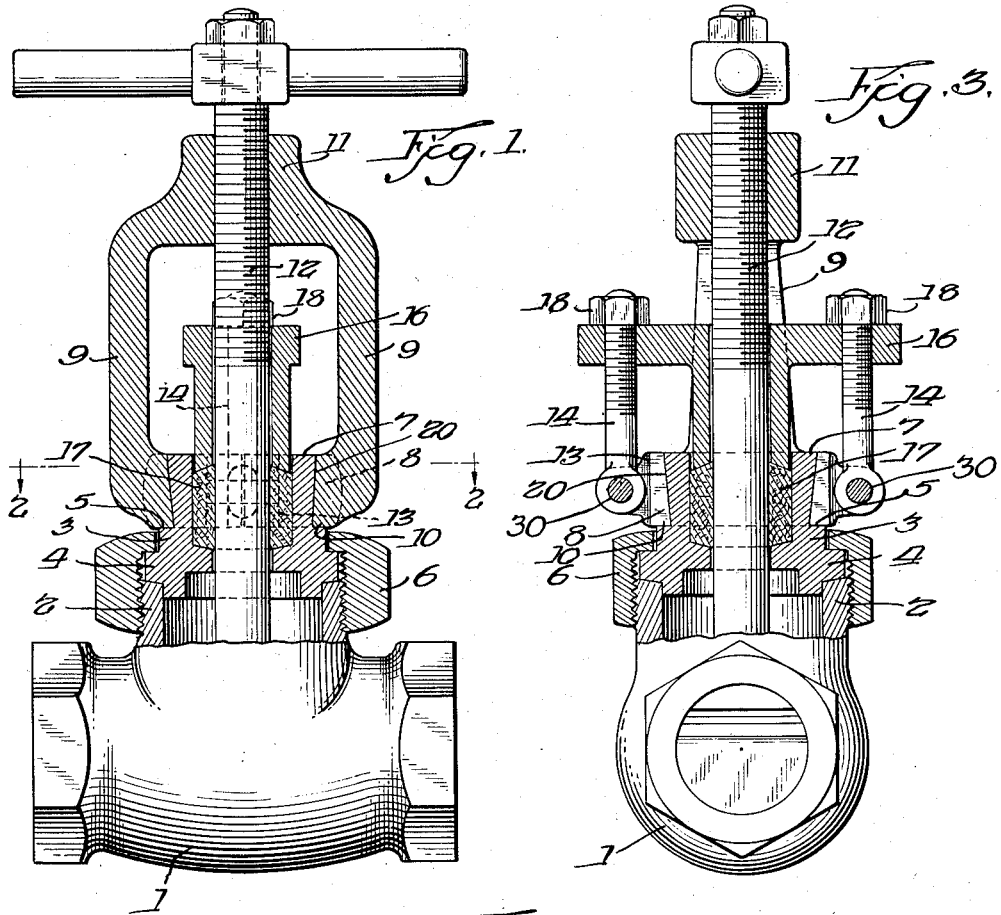
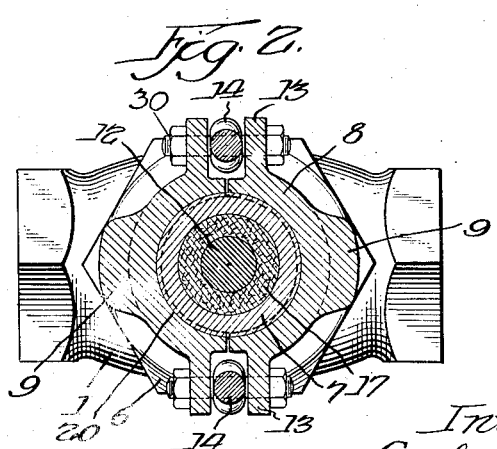
Inventors:
Carl A. Dopp, &
Eugene C. Petrie
By: Joseph O. Lange Atty.

Aug. 7, 1951     C. A. DOPP ET AL     2,563,012
VALVE

Filed Feb. 17, 1945     2 Sheets-Sheet 2

Inventors:
Carl A. Dopp, &
Eugene C. Petrie;
By: Joseph O. Lange, Atty.

Patented Aug. 7, 1951

2,563,012

UNITED STATES PATENT OFFICE 2,563,012

VALVE

Carl A. Dopp, Park Ridge, and Eugene C. Petrie, Elmhurst, Ill., assignors to Crane Co., Chicago, Ill., a corporation of Illinois Application February 17, 1945, Serial No. 578,432

8 Claims. (Cl. 251—49)

This invention relates to valves and more particularly it pertains to valves in which a yoke structure with a union ring connection may be employed thus possessing the advantages of the well known union bonnet construction. This invention constitutes a modification of the construction shown in U. S. Patent No. 1,866,292, granted July 5, 1932, in which the assembly of the yoke to the bonnet portion of the valve is accomplished by means of a threaded connection, whereas, here in contrast thereto, the invention applies to an assembly accomplished by means of a tapered bonnet and yoke connection, the yoke preferably being of a resilient material for reasons hereinafter made clear.

This invention has for one of its principal objects the provision of a relatively economical means for constructing a union bonnet valve employing a connecting union ring of relatively small dimensions, the yoke being preferably assembled with the bonnet connecting piece after the union ring has been attached to the body.

A further object of the invention lies in providing for a construction in which the means for using a substantial bolted stuffing box are provided without requiring the use of a large union ring.

As will become more readily apparent, the novel element of the present invention is conveniently combined by means of a union ring with the bonnet and body to assemble the yoke therewith. The yoke is preferably of a resilient material. Thus its arms are capable of being spread outwardly to pass over the bonnet hub member and then slipped downwardly over the tapered connection to abut against a shoulder on the hub member. The usual yoke bolts are then tightened thus drawing the yoke arms together and providing a sturdy yoke assembly longitudinally immovable.

Another important object of the present invention is to provide a construction in which the yoke is rigidly supported so that when the valve is operated any axial motion in either direction is substantially prevented and access to the packing is not interfered with.

Other important objects and advantages will become readily apparent upon proceeding with the specification read in light of the accompanying drawings, in which Fig. 1 is a vertical longitudinal sectional assembly view of a valve constructed in accordance with a preferred embodiment of this invention.

Fig. 2 is a section taken on the line 2—2 of Fig. 1.

Fig. 3 is a vertical sectional assembly view taken at right angles to Fig. 1.

Similar reference numerals refer to similar parts throughout the several views.

Figure 4:
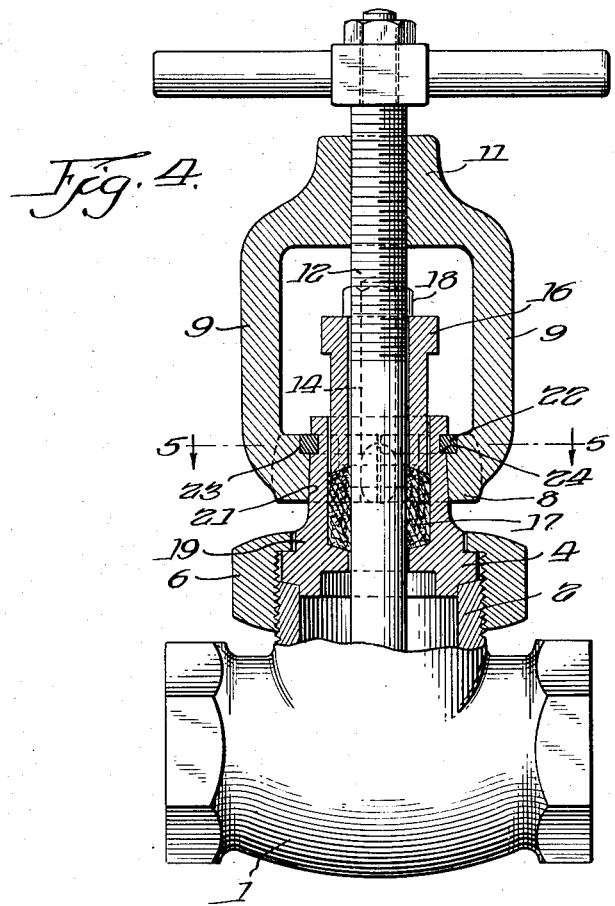
Fig. 4 is a sectional assembly view of a modified form of the invention.
Figure 5:
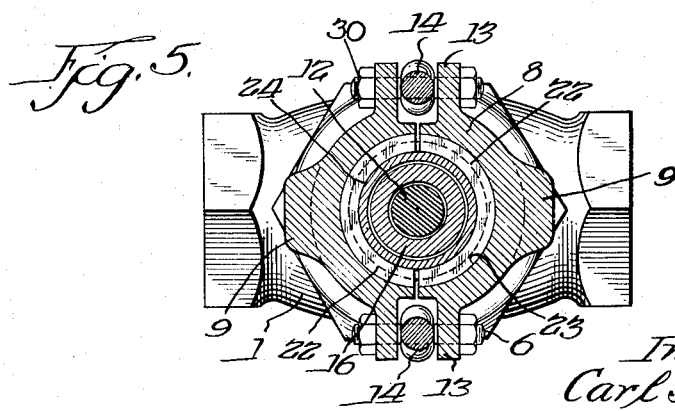
Fig. 5 is a sectional view taken on the line 5—5 of Fig. 4.

Referring now to the drawings and particularly to Figs. 1 and 2, an assembled valve is shown with the body 1 having the threaded bonnet connecting portion 2. The bonnet assembly comprises a sleeve-like connecting member 3, one end of which is flanged as at 4 to provide a ground joint with the upper edge of the portion 2 of the body by means of a threaded union ring 6. The upper portion of the connecting member or bonnet 3 is preferably provided with an inwardly tapered annular portion 7 and preferably, but not necessarily, having at its lowermost limit a shoulder 5 against which the divided or split lower end 8 of the yoke abuts, and which is substantially circular in form at its lowest portion. As indicated at 10, it may be spread sufficiently to pass easily over the upper and larger end portion 20 of the tapered portion 22. The yoke is provided with the usual supporting arms 9 which extend upwardly and terminate in a stem guide bearing portion 11 which is threaded internally to receive the threaded portion of the valve stem 12. Obviously the upper end portion 11 may vary substantially from the particular embodiment shown.

As shown more clearly in Figs. 2 and 3, the lower ring portion 8 of the yoke, because of employment of the bolts 30 and the lower split yoke construction, is provided with means for support of the flanged gland 16 which may be maintained in packing compression position by means of the spaced ears 13 placed diametrically opposite each other and between which are pivoted the eye bolts 14 journaled on the bolts 30. The eye bolts 14 project upwardly through apertured ends of the flanged gland 16 as shown. The gland is mounted within the stuffing box 17 formed in the connecting member 3 and is thus adjustably held by means of the nuts 18 (Fig. 2). The bolts 30 not only support the eye bolts 14 to thereby compress the packing, but also serve to maintain the split lower halves of the yoke together on the tapered surface 20 when the nuts mounted on the bolts 30 are suitably tightened.

It should be understood of course that the gland eye-bolt construction shown in these drawings may be varied substantially without affecting the principle of this invention.

Referring now to the modification shown in Fig. 4, instead of using the inwardly tapered portion 20 on the connecting member 3 as shown in Fig. 1, the connecting member or bonnet 19 held in the same manner as the bonnet member 3 of Fig. 1, is provided with a slightly tapered portion 21 extending in an opposite direction, that is it is outwardly tapered. In this modification, the lower split ring 8 of the yoke is provided with a corresponding taper to receive the tapered portion 21 of the connecting member 19. Near the upper portion of the split lower ring 8 the latter member is recessed to allow for the outer portion of the split ring 22 to be nested within the recess 23, the connecting member 19 having a complementary annularly relieved portion 24 to receive the inner portion of the split ring 22. Thus in assembly the lower split portion 8 of the yoke is initially spread apart so as to slip over the outside diameter of the ring 22, then dropping below the latter onto the tapered portion 21 sufficiently so as to permit placing the split ring 22 into the annular grooves 23 and 24. The same arrangement of gland support construction 14 and bolting means 30 to draw the lower split halves of the yoke together on the taper 21 may be used as described in connection with Fig. 1.

In summary, it will thus be apparent that by the novel construction herein described the threaded connection referred to in the above mentioned patent may be dispensed with. Instead a simple, threadless, sturdy connection may be provided by using a lower split yoke construction preferably integral at its upper end portion but which is made sufficiently flexible or resilient to permit spreading the lower split portion of the yoke, as at the ring portion 8, to permit slipping it over either the tapered portion 20 or the oppositely tapered portion 21, respectively shown in Figs. 1 and 4. Thus when the resilient yoke in its lower split portion is drawn together by means of the through bolts 30 so as to form a substantial connection with the respective tapered portions above referred to, it will be evident that an unusually strong and durable construction has been obtained. Likewise, repairs may be made relatively easily on valves already installed, since the lower split yoke may be easily rotated through various angles thereby lending itself easily adaptable to space restrictions especially when packing the stuffing box which can be done without disturbing the setting of the union ring 6.

It should thus be apparent that a valve has been provided which gives all of the advantages of a union bonnet valve as well as possessing the sturdiness found in the usual integral yoke structure. It should also be realized that in view of the type of connection provided, the proportions may be suitably varied to provide for relatively large valves and for the higher pressures.

It is obvious that many changes may of course be made in the details of construction without departing from the spirit and scope of the invention as defined in the claims appended hereto.

We claim:

1. In a valve construction for supporting an actuating mechanism including a stem, a body, a yoke having a pair of spaced apart flexible arms movable outwardly relative to a valve stem guide at one end, the said arms having inner annular surfaces oppositely disposed, a bonnet member between said body and yoke, means for securing said yoke to said bonnet member, the said bonnet member having an annular inwardly tapered portion engageable by the annular surfaces of the arms of the said yoke to connect the said arms and bonnet together, a stuffing box provided by the said bonnet member, packing therefor, bolting means to compress the packing, the yoke arms being sufficiently flexible to permit being removed from the tapered portion of the said bonnet upon releasing said securing means and springing the said flexible arms outwardly, the said means for securing the yoke to said bonnet member supporting said bolting means against axial movement when compressing the packing within the said bonnet.

2. In a valve construction for supporting an actuating mechanism including a stem, a body member, a yoke having flexible spaced arms terminating in an integral valve stem guide at one end, a connecting element secured to the other end of said arms, said connecting element being removable relative to the said body member, annular tapered means interposed in locked relation between said arms and the said connecting element, holding means for effecting said locked relation, whereby the said yoke and said connecting element in cooperation with the said holding means are inhibited against relative longitudinal movement, the said other end of said arms being split to permit passing said arms over the said connecting element, the said arms and connecting element having annular inwardly tapered portions to effect a connection therebetween, the flexibility of the said arms permitting the said latter members to be spread apart and thereby rendered removable over the tapered portion of the said connecting element upon releasing the said holding means.

3. In a valve construction for supporting an actuating mechanism including a stem, a body member, a yoke having spaced arms integrally supported relative to a valve stem guide at one end thereof and movable outwardly relative thereto to a limited extent, a connecting element having an annular tapered neck portion adapted to be positioned between the spaced portions of the said arms, the spaced portions of said arms having inner tapered surfaces substantially matching with the annular tapered neck portion of the said connecting element, means for holding the said yoke arms firmly around the tapered neck portion of the said connecting element to inhibit relative longitudinal movement between said yoke and the connecting element.

4. In a valve construction for supporting an actuating mechanism including a stem, a body member, a bifurcated yoke having a pair of spaced resilient arms terminating in an integral stem guide at one end with the bifurcated portion forming the arms, the said latter portions having oppositely disposed tapered faces at the opposite end, a removable connecting element secured to the bifurcated end of the yoke, the said connecting element having an inwardly tapered portion engaged by the said yoke having similarly tapered face portions, the diameter of the tapered portion of the connecting element at its largest and being less than the distance across the space between the tapered faces of the said yoke arms to permit an end portion of the said connecting element to be received between said arms, threaded means removably mounted relative to the said yoke member to secure the said connecting element at a location within the transverse plane defined by the said tapered portion to the said body member.

5. In a valve construction for supporting an actuating mechanism including a stem, a body member, a yoke having a pair of integral resilient spaced arms terminating in a valve stem guide at one end with a split construction at the other end forming said arms and having a discontinuous annularly arranged connecting element removably secured to the latter end, a second connecting member engaged by the first named annular connecting element, the said second connecting member having a tapered surface portion engaged by the said split yoke portion and cooperating with the said discontinuous annular connecting element to hold the said second connecting member against longitudinal movement, threaded means for holding the said spaced arms snugly around the tapered portion of the said second connecting element to maintain the latter element and yoke in locked relation.

6. In a valve construction for supporting an actuating mechanism including a stem, a body member, a yoke having resilient spaced apart arms terminating in a valve stem guide at one end and with said spaced apart arms at the other end, a removable connecting element secured to the spaced arms of the yoke, the said connecting element having an annularly extending tapered portion to engage similarly tapered portions oppositely disposed on the arms of the said yoke, means for securing the connecting element to the said body member and transversely extending means above said latter means for clamping the said arms around an annular tapered portion of the said connecting element.

7. In a valve construction for supporting an actuating mechanism including a stem, a body member, a yoke having a plurality of spaced arms terminating in an integral valve stem guide at one end and with a spaced apart portion at the other end to form the said arms, the latter having oppositely disposed tapered ends, a connecting member normally positioned between said tapered ends, the said connecting member having an annular inwardly tapered portion to engage the similarly tapered inner surfaces on the end portions of the said arms, the said arms being flexible and being outwardly movable to span the largest dimension of the said tapered portion of the connecting member, means engaging lugs on the oppositely disposed tapered end portions of the said arms to thereby clamp the said yoke to the tapered portion of the said connecting member.

8. In a valve construction for supporting an actuating mechanism including a stem, a body, a yoke of resilient material having spaced apart arms with tapered inner surfaces and terminating in an integral valve stem guide at one end, a bonnet connected to said body of smaller diameter than the distance defining the space between the tapered inner surfaces of the said arms, split annular means positioned at the lower portion of the yoke for securing the said latter member to the said bonnet, the said means for securing the said yoke to the said bonnet having an inwardly tapered portion engaged by the split lower portion of the said yoke, the lower portion of the yoke arms being inwardly tapered and removable over the upper end of the tapered portion of the said bonnet and arranged to support the said split annular means upon spreading the said arms to increase the space therebetween, means engaging the lower portion of the said yoke arms to reduce the space between the arms upon predetermined engagement whereby the said yoke is fixedly attached to the tapered portion of the said bonnet to engage the said annular split means.

CARL A. DOPP.
EUGENE C. PETRIE.

REFERENCES CITED

The following references are of record in the file of this patent:

UNITED STATES PATENTS

| Number | Name | Date |
|---|---|---|
| 422,013 | Ekstrom | Feb. 25, 1890 |
| 1,230,448 | Tuttle | June 19, 1917 |
| 1,241,819 | Campbell | Oct. 2, 1917 |
| 1,311,272 | Gumpper | July 29, 1919 |
| 1,670,574 | Howell | May 22, 1928 |
| 1,736,405 | Houser | Nov. 19, 1929 |
| 1,866,292 | Carlson | July 5, 1932 |
| 1,995,395 | Mohr | Mar. 26, 1935 |

FOREIGN PATENTS

| Number | Country | Date |
|---|---|---|
| 420,194 | Great Britain | of 1934 |